United States Patent
Gumhold

[15] 3,693,810
[45] Sept. 26, 1972

[54] APPARATUS FOR FEEDING BARS OR THE LIKE IN MACHINE TOOLS

[72] Inventor: Gunther Gumhold, Esslingen/Neckar, Germany

[73] Assignee: Index-Werke KG Hahn & Tessky, Esslingen/Neckar, Germany

[22] Filed: Jan. 20, 1971

[21] Appl. No.: 108,101

[52] U.S. Cl. .................. 214/1.5, 82/2.7, 198/211
[51] Int. Cl. ............................................. B65h 5/16
[58] Field of Search .......... 214/1.1, 1.2, 1.3, 1.4, 1.5; 82/2.5, 2.7; 198/107, 211

[56] References Cited

FOREIGN PATENTS OR APPLICATIONS

| 1,367,880 | 6/1964 | France | 214/1.5 |
| 851,666 | 10/1960 | Great Britain | 214/1.4 |
| 630,341 | 10/1949 | Great Britain | 214/1.5 |

Primary Examiner—Gerald M. Forlenza
Assistant Examiner—Frank E. Werner
Attorney—Michael S. Striker

[57] ABSTRACT

Apparatus for feeding bars in machine tools has a cylindrical housing for a group of parallel cylindrical guides which are rotatable in the housing as a unit to place a selected guide into a feeding position in which a workpiece which is inserted into the selected guide can be fed lengthwise to enter a machine tool. The group of guides is surrounded by a jacket consisting of soundproofing material and the guides are disposed in pairs with the guides of each pair located diametrically opposite each other with reference to the axis of the housing and having different internal diameters. The advancing mechanism for moving a bar in the selected guide lengthwise has a pusher which is introduced into the selected guide behind an inserted bar and is urged forwardly by a cable which is connected to a weight.

8 Claims, 4 Drawing Figures

PATENTED SEP 26 1972 3,693,810

Inventor:
GUNTHER GUNHOLD
By

APPARATUS FOR FEEDING BARS OR THE LIKE IN MACHINE TOOLS

BACKGROUND OF THE INVENTION

The present invention relates to apparatus for feeding round or polygonal bars, pipes or analogous elongated workpieces in turning machines or other types of machine tools. More particularly, the invention relates to improvements in feeding apparatus of the type wherein a workpiece which is to be fed lengthwise into a machine tool is confined in a tubular guide and is pushed or pulled toward the machine tool.

It is already known to provide a bar feeding apparatus with a cylindrical housing for two tubular guides having different internal diameters. Each guide can be placed into registry with the work spindle of a machine tool and then receives a bar which is fed forwardly by a suitable pusher. The pusher receives motion from a motion transmitting member which extends through longitudinal slots provided in the two guides and is connected to a member extending lengthwise of the other guide and forming part of a drive which is capable of moving the pusher forwardly.

A drawback of such feeding apparatus is that they are incapable of properly guiding bars having widely different external diameters. Thus, the diameter of a particular bar may be such that it exceeds the internal diameter of one of the guides but is much smaller than the internal diameter of the other guide so that the bar cannot be maintained in requisite axial alignment with the spindle of the machine tool.

SUMMARY OF THE INVENTION

An object of the invention is to provide an apparatus which serves to feed bars, pipes or analogous elongated workpieces in machine tools and is more versatile than presently known feeding apparatus.

Another object of the invention is to provide a feeding apparatus which can be used for lengthwise transport of elongated workpieces having diameters ranging from very small to very large.

A further object of the invention is to provide the feeding apparatus with a novel arrangement of guides for workpieces which insure that a workpiece is maintained in requisite alignment with the work-receiving parts of a machine tool, such as a turning machine, a single-spindle or multiple-spindle automatic or the like.

An additional object of the invention is to provide the feeding apparatus with novel noise-suppressing and work-advancing means.

The invention is embodied in an apparatus for feeding bars, pipes or analogous elongated workpieces in turning machines or other types of machine tools. The apparatus comprises a preferably horizontal elongated open-ended cylindrical housing and a group of at least three (but preferably four, six, eight or another number of) parallel open-ended tubular guides mounted in the housing and having axes preferably located on a circle having its center on the axis of the housing. The guides are connected to each other, for example, by welding and have different internal diameters, and the group is turnable about the axis of the housing (namely, with or relative to the housing) so as to place a selected guide into a predetermined feeding position in which a workpiece inserted into the selected guide registers with a chuck or other gripping means of a machine tool and can be fed lengthwise by a suitable advancing mechanism. Such advancing mechanism can be provided with pusher means which is introduced into the selected guide behind an inserted workpiece, and shifting means which is arranged to move the pusher means in the selected guide toward the machine tool to thereby feed the workpiece by increments of desired length. The shifting means can employ a cord or candle which extends into the guide occupying a position diametrically opposite the selected guide or into an elongated passage defined by the group of guides around the axis of the housing.

The group of guides is preferably surrounded by a jacket consisting of foam rubber, sand or other suitable soundproofing material.

The novel features which are considered as characteristic of the invention are set forth in particular in the appended claims. The improved feeding apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
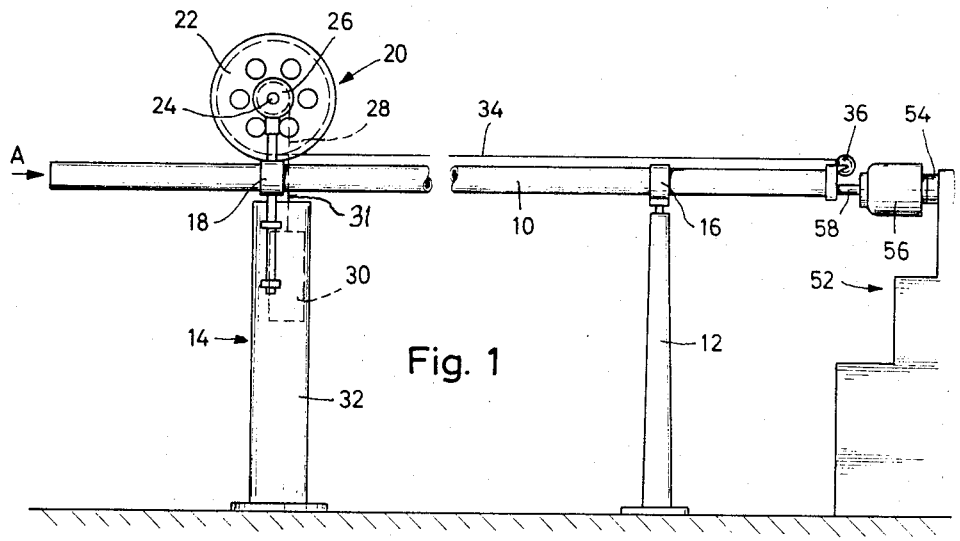
FIG. 1 is a fragmentary side elevational view of a feeding apparatus which embodies the invention, further showing a portion of a machine tool which receives workpieces from the feeding apparatus.

Referring first to FIG. 1, there is shown a feeding apparatus for elongated metallic bars 58 or analogous workpieces. The apparatus serves to feed such workpieces to a machine tool 52, e.g., a turning machine having a work spindle 54 provided with a chuck 56 which can be opened and closed to respectively permit and interrupt the forward movement of the workpiece 58.

Figures 2, 4:
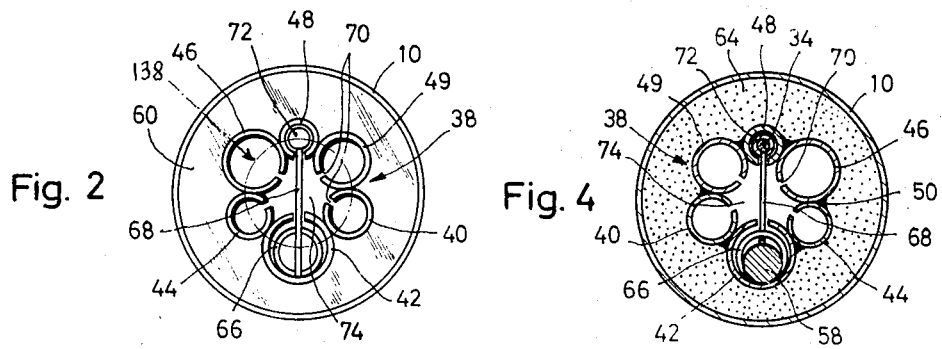
FIG. 2 is an enlarged end elevational view of the housing of the feeding apparatus, as viewed in the direction indicated by the arrow A of FIG. 1.
FIG. 4 is an enlarged transverse vertical sectional view as seen in the direction of arrows from the line 4—4 of FIG. 3.
Figure 3:
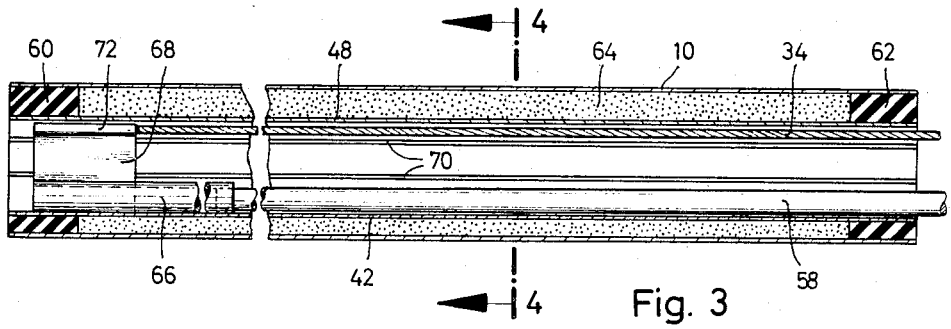
FIG. 3 is an enlarged fragmentary axial sectional view of the housing of the feeding apparatus.

The feeding apparatus comprises an elongated horizontal cylindrical housing or sleeve 10 which is open at both ends and is supported by holders 16, 18 mounted on stationary upright supports 12 and 14. The numeral 20 denotes an advancing mechanism or drive which serves to move the workpiece 58 lengthwise beyond the forward (right-hand) end of the housing 10 and toward the spindle 54 when the chuck 56 is open. In the illustrated embodiment, the advancing mechanism 20 is operated by gravity and comprises a weight or mass 30 which is movable up and down in a hollow column 32 of the support 14. The weight 30 is suspended on a cable or cord 28 which is connected at one end to and is convoluted around a relatively small driver pulley 26. The latter is rotatable on a horizontal shaft 24 mounted in an upwardly extending arm 31 of the column 30. The pulley 26 is rigid with a coaxial driven pulley or reel 22 which is rotatable on the shaft 24 and has a core connected with one end of a second cable or cord 34. The latter is trained over a sheave 36 at the forward end of the housing 10 and extends into the interior of the housing to form part of a shifting means for a pusher 66 shown in FIGS. 2-4.

In accordance with a feature of the invention, the feeding apparatus further comprises a package or group 38 of at least three but preferably at least four parallel elongated tubular guides (hereinafter called tubes for short) which are rigidly connected to each other and are turnable as a unit in the interior of and about the axis of the housing 10. In the illustrated embodiment, the group 38 comprises six tubes 40, 42, 44, 46, 48, 49 having axes which are parallel to the axis of the housing 10 and located on a circle 138 (indicated in FIG. 2 by phantom lines). The center of the circle 138 is located on the axis of the housing 10 and the tubes enclose an elongated passage 74 which surrounds the axis of the housing 10, i.e., the radii of outer surfaces of the tubes are shorter than the radius of the circle 138. The tubes form three pairs including a first pair consisting of tubes 40, 46, a second pair consisting of tubes 42, 48 and a third pair consisting of tubes 44, 49. The tubes of each pair are disposed diametrically opposite each other with reference to the axis of the housing 10, and the internal diameter of one tube of each pair substantially exceeds the internal diameter of the other tube of the respective pair. For example, it will be seen (by referring to FIG. 2 or 4) that the internal diameter of the tube 48 is much smaller than the internal diameter of the tube 42. The external diameters of all tubes may but need not be identical; in the illustrated feeding apparatus, the tubes have different external diameters because their wall thickness is substantially uniform, and the tubes are bonded to each other, preferably by longitudinally extending welding means 50 which seal the space surrounding the group 38 from the passage 74. Such space is filled by a jacket 64 consisting of soundproofing material, for example, sand or fragments of foam rubber. The front and rear ends of the tubes are open and are respectively surrounded by elastic bearing sleeves 62, 60 consisting of rubber or the like and being rotatable in the respective end portions of the housing 10 so as to place a selected tube into a predetermined feeding position in which the axis of a workpiece in the selected tube registers with the axis of the spindle 54 in the machine tool 52. In the angular position which the group 38 occupies in FIGS. 2-4, the tube 42 is located in the feeding position so that the axis of the workpiece 58 therein coincides or is in substantial axial alignment with the axis of the chuck 56 and spindle 54. The means for changing the angular position of the group 38 so as to move a desired tube into the feeding position is not shown in the drawing. For example, the group 38 can be indexed by a mechanism which automatically arrests the group when a selected tube reaches the feeding position and which thereupon holds the group against uncontrolled movement from such position.

An important advantage of the illustrated group 38 is that it renders it possible to feed round or polygonal bars, pipes or analogous workpieces whose diameters vary within a wide range and to maintain a workpiece in requisite alignment with the spindle 54 even if the external diameter of the workpiece is less than the internal diameter of that selected tube which is held in the feeding position. The chuck 56 can be actuated by hydraulic or pneumatic means to open at desired intervals and to thus permit the advancing mechanism 20 to move the workpiece 58 lengthwise so as to push the front end of the workpiece beyond the selected tube 42 which is located in the feeding position and into the range of one or more material removing tools in the machine tool 52.

In accordance with a slight modification of the invention, the group 38 can be replaced with a group containing a series of at least three tubes and wherein the internal diameter of each preceding tube, as considered in the circumferential direction of the housing 10, exceeds the internal diameter of the next-following tube. This enables the operator to more readily select that tube whose internal diameter is best suited to guide a workpiece having a predetermined external diameter. In the illustrated group 38, a tube (40, 44 or 48) having a relatively small internal diameter is flanked by two tubes having larger internal diameters.

The elastic bearing sleeve 60, 62 further serve as a means for confining the soundproofing jacket 64 in the space between the exterior of the group 38 and the internal surface of the housing 10, especially if the jacket consists of sand or other readily flowing material with good soundproofing characteristics.

The aforementioned shifting means of the advancing mechanism 20 for workpieces 58 comprises the aforementioned cable or cord 34 which extends rearwardly from the sheave 36, through the interior of that tube (48) which is located diametrically opposite the tube (42) in feeding position, and is connected to a motion transmitting portion 68 by means of a connector 72 slidable in the tube 48. Each of the tubes 40, 42, 44, 46, 48, 49 has a longitudinally extending slot 70 which communicates with the passage 74 and permits slot motion transmitting portion 68 to extend from the slot 70 of the tube (48) which accommodates the cable 34, across the passage 74, and through the slot 70 of the tube (42) in feeding position. In the illustrated embodiment, the tube (42) which is located in the feeding position is disposed at a level below the other tubes but it is clear that the feeding apparatus can be set up in such a way that the spindle 54 of the machine tool 52 registers with a tube which is located at a position other than the 6 o'clock position shown in FIG. 2 or 4.

The operation of the improved feeding apparatus will be readily understood upon perusal of the preceding disclosure. Thus, the group 30 must be indexed to place a selected tube into the feeding position and a fresh workpiece 58 is thereupon introduced into such selected tube from the rear end, namely, from that end which is remotest from the machine tool 52. The pusher 66 is thereupon introduced into the rear end of the selected tube (42) so that it abuts against the adjacent trailing end of the inserted workpiece. The cable 34 tends to move the workpiece 58 forwardly because it urges the motion transmitting portion 68 of the shifting means and hence the pusher 66 in a direction toward the front end of the selected tube under the action of the weight 30 which tends to descend in the column 30 by gravity. It is advisable to employ a full set of pushers 66, motion transmitting portions 68 and connectors 72, one set for each of the tubes in the group 38. The connectors 72 are preferably detachable from the cable 34 so that the operator can rapidly attach a pusher 66 which is movable with satisfactory clearance in the selected tube assuming the feeding position. The spindle 54 is preferably provided with a stop which arrests the workpiece 58 when the chuck 56 is open and after the advancing mechanism 20 has completed the transport of the workpiece through a predetermined distance.

In the illustrated feeding apparatus, the slots 70 of each pair of tubes are located in a plane which further includes the axes of the respective tubes and the axis of the housing 10, i.e., a properly installed motion transmitting portion 68 extends diametrically of the housing. However, it is also within the purview of the invention to use a shorter motion transmitting portion which extends from the inserted pusher 66 through the slot 70 of the tube in feeding position and into the passage 74. The cable 34 is then guided by the sheave 36 in such a way that it extends directly into the front end of the passage 74 and need not pass into that tube (48) which is located diametrically opposite the tube (42) assuming the feeding position. In such feeding apparatus, the slots 70 of pairwise arranged tubes need not be located in a common plane.

If the operator wishes to feed a workpiece having an external diameter which is much smaller than the internal diameter of the tube 42, the aforementioned indexing mechanism is actuated (or the group 38 is rotated by hand) so as to place another tube (for example, the tube 44) into feeding position. The pusher 66 is then preferably replaced with a smaller-diameter pusher which can be inserted into the tube 44 requisite clearance, and the motion transmitting portion 68 for such pusher then extends through the slot 70 of the tube 44 and either into the passage 74 or into the associated tube 49 to be connected with the adjacent end of the cable 34. The apparatus is then ready for use and automatically advances the workpiece through a desired distance (normally determined by the aforementioned stop of the spindle 54) when the chuck 56 is caused to open.

The passage 74 is unoccupied excepting that it receives that part of the motion transmitting portion 68 which extends between the slots 70 of the tubes 42 and 48. Of course, the passage 74 can receive the cable 34 if the portion 68 is replaced with a motion transmitting portion which extends inwardly through the slot 70 of the selected tube 42 but does not reach the slot of the tube 48.

It is also within the purview of my invention to employ a group which comprises at least three tubes and wherein the tubes need not be disposed in pairs, especially if the cable 34 is guided into the passage 74. In such groups, the slots 70 need not face the axis of the housing 70, as long as they open into the passage 74 so as to enable the cable 34 in this passage to pull a pusher 66 in the tube which occupies the feeding position. Furthermore, the axes of the tubes need not be located on a circle having its center on the axis of the housing 10. Thus, the tubes can be connected to each other in random distribution, as long as each thereof can be placed into the feeding position in response to rotation of the group or housing and/or in response to appropriate adjustment of the holders 16, 18. However, a group which is rotatable in the housing is preferred at this time because such mounting of the group facilitates convenient and time-saving indexing to place a selected tube into the feeding position.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is:

1. Apparatus for feeding elongated bars or analogous workpieces in machine tools, comprising an elongated cylindrical housing; a group of at least three parallel tubular guides in said housing and having axes located on a circle having its center on the axis of said housing, said guides having different internal diameters and being connected to each other and define together an elongated passage which surrounds the axis of said housing, each of said guides having a longitudinally extending slot communicating with said passage and a front and a rear end, said group being turnable about the axis of said housing to place a selected guide in a feeding position in which a workpiece in the selected guide can be fed lengthwise beyond the front end of said selected guide and into a machine tool; and advancing means including pusher means insertable into the rear end of said selected guide behind a workpiece therein, and shifting means including a first portion connected with said pusher means and extending through the slot of the selected guide into the passage and a second position within said housing and extending lengthwise of said passage beyond one end of said housing.

2. Apparatus as defined in claim 1, wherein said group comprises at least two pairs of guides and wherein the guides of each pair are located diametrically opposite each other with reference to the axis of said housing.

3. Apparatus as defined in claim 2, wherein the internal diameter of one guide of each of said pairs differs substantially from the internal diameter of the other guide of the respective pair.

4. Apparatus as defined in claim 1, further comprising a jacket consisting of soundproofing material, said jacket surrounding said group and being received in said housing.

5. Apparatus as defined in claim 1, wherein the guides of said group are bonded to each other.

6. Apparatus as defined in claim 1, wherein said group comprises a series of at least four guides as considered in the circumferential direction of said housing and wherein the internal diameter of each preceding guide of said series exceeds the internal diameter of the next-following guide.

7. Apparatus as defined in claim 1, wherein said group includes at least two pairs of guides and wherein the guides of each pair are located diametrically opposite each other with reference to the axis of said housing, the slots of guides of each of said pairs being located in a common plane including the axes of the respective pair of guides and the axis of said housing.

8. Apparatus as defined in claim 1, further comprising elastic bearings provided in said housing and surrounding the front and rear ends of said guides.

* * * * *